J. P. McENROE.
REAR SEAT ATTACHMENT FOR MOTORCYCLES.
APPLICATION FILED JAN. 22, 1919.
1,317,378.
Patented Sept. 30, 1919.
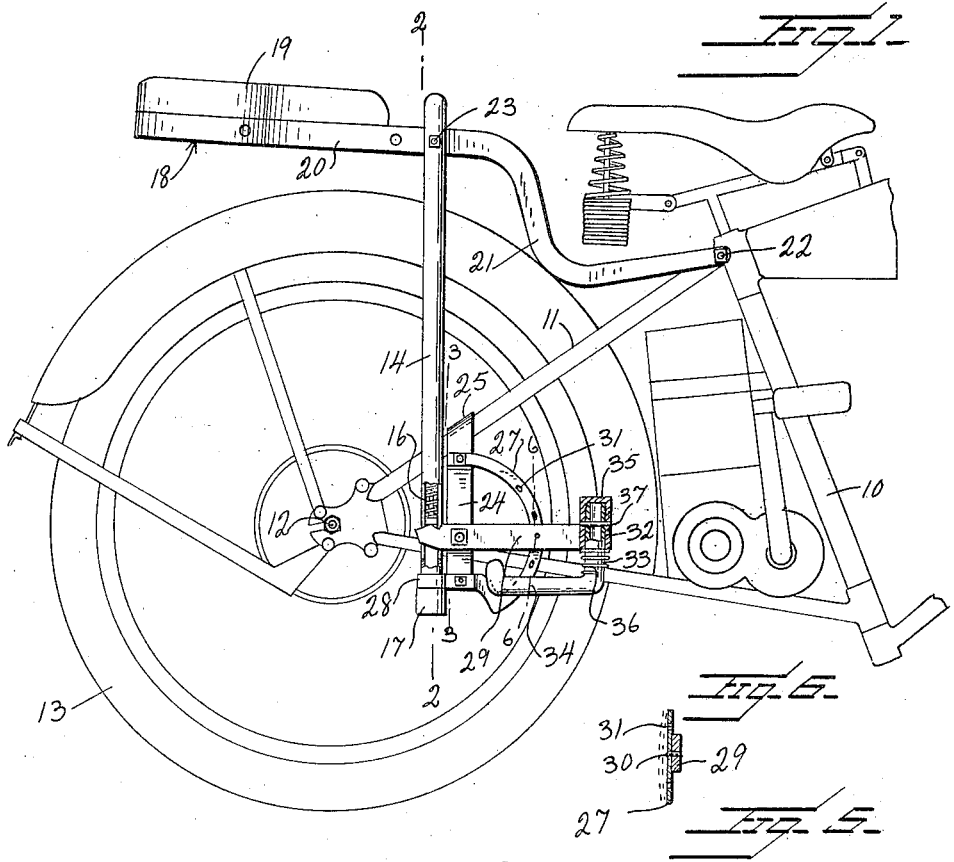
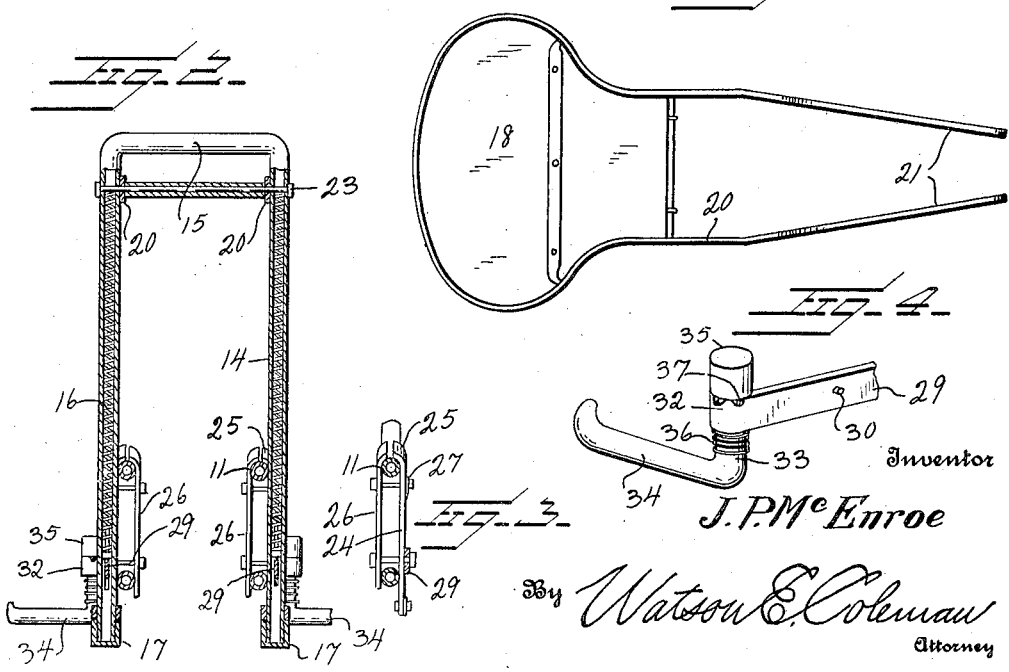
Inventor
J. P. McEnroe
By Watson E. Coleman
Attorney

UNITED STATES PATENT OFFICE.

JOHN P. McENROE, OF NORTH TOPEKA, KANSAS.

REAR-SEAT ATTACHMENT FOR MOTORCYCLES.

1,317,378.  Specification of Letters Patent.  Patented Sept. 30, 1919.

Application filed January 22, 1919. Serial No. 272,521.

*To all whom it may concern:*

Be it known that I, JOHN P. MCENROE, a citizen of the United States, residing at North Topeka, in the county of Shawnee and State of Kansas, have invented certain new and useful Improvements in Rear-Seat Attachments for Motorcycles, of which the following is a specification reference being had to the accompanying drawings.

This invention relates to motorcycles, and particularly to means for providing a rear or tangential seat on the motorcycle.

The general object of the invention is to provide a rear seat for motorcycles which may be readily applied to or removed from the motorcycle itself and which is very simple in construction and application.

A further object is to provide a seat of this character which is resiliently supported and in which the degree of resilient resistance to the weight of the rider may be readily controlled.

A further object is to provide foot operated means whereby the supporting springs may be tensioned to a greater or less degree and particularly to provide seat supporting levers pivotally supported upon the frame of the machine, these levers at one end engaging the springs which support the seat and at their other ends being provided with foot rests.

A further object is to provide foot rests which may be swung rearward to an inoperative position or swung out to an operative position and provide means for holding the foot rests in their operative positions.

Other objects will appear in the course of the following description.

My invention is illustrated in the accompanying drawings, wherein—

Figure 1 is a fragmentary side elevation of a motorcycle equipped with my attachment, the attachment being partly in section.

Fig. 2 is a vertical section on the line 2—2 of Fig. 1.

Fig. 3 is a section on the line 3—3 of Fig. 1.

Fig. 4 is a perspective fragmentary detail view of a lever 29 and the foot rest.

Fig. 5 is an underside plan view of the saddle and the arms 21, and

Fig. 6 is a fragmentary section on the line 6—6 of Fig. 1.

Referring to these drawings, it will be seen that I have illustrated an ordinary motorcycle of a well known type, only the general features of the motorcycle being illustrated, however, this motorcycle including the seat supporting post 10 and the rearwardly and downwardly extending frame bars 11 operatively connected to the bearing for the rear axle 12 for the rear wheel 13.

My attachment comprises oppositely disposed, upwardly extending, parallel supporting members 14 joined by an integral cross bar 15. The lower ends of these members 14 are vertically slotted and tubular and disposed within these tubular legs or supports 14 are the coiled compression springs 16. The lower ends of the tubular members are closed by caps 17. The seat 18 is formed of a base and a cushion or pad 19, having the usual shape of a bicycle seat, and attached around the edge of the base of the seat 18 is a steel rod or strip 20 bent to embrace the base of the seat, the two ends of the rod being extended forward, downward and again forward, thus providing the arms 21, these arms being disposed in convergent relation and adapted to be pivotally connected by a bolt 22 to the saddle post 10. The arms 21 are also bolted by a bolt 23 to the legs 14 or supporting members.

Mounted upon the lower end of each supporting members 14 is a supporting bracket 24 of strap iron, the upper end of the strip of metal forming this bracket being bent, as at 25, to partly embrace the brace rod 11 and disposed inward of the member 24 is the member 26 which is also bent to partially embrace the rod 11 and complement or coact with the member 24. Also bolted to these members 24 and 26 is an arcuate strip of spring steel 27 which extends downward in a curve below the members 24 and 26 and then upward and rearward and passes between said members to which it is bolted at this point and then is formed with an eye 28 loosely embracing the lower end of the corresponding supporting member 14. Pivotally mounted between each pair of members 24 and 26 is a lever 29, the rear end of which extends through the slots of the member 14 and engages beneath the corresponding spring 16, as illustrated clearly in Fig. 1. This lever is formed with a laterally projecting pin or lug 30 and the arcuate bar 27 is provided with a plurality of apertures 31, with any one of which the corresponding pin 30 is adapted to engage. The forward end of each lever 29 is bent to form a bead or eye 32 to receive the upwardly extending shank 33 of a foot rest 34. The shank 33 extends upward through the eye 32 and at its upper end carries a cap 35. A coiled spring 36 engages the eye 32 and the lower portion of the shank 33 and acts to urge the foot rest into a position parallel to the lever 29 and also acts to urge the shank 33 downward. The cap 35 is formed with one or more lugs 37 and the upper end of the eye is also formed with notches into which the lugs may engage. Thus the foot rest may be held in its forwardly projecting position or readily released and permitted to extend rearward parallel to the lever 29.

It will be seen that with this construction the whole weight of the rider is carried downward by the vertical members 14 to the springs and that thus the rider is yieldingly supported upon the springs. If it is desired to adjust the seat, then the arcuate resilient bars 27 are forced inward a distance just sufficient to permit the pins 30 to escape the perforations 31 and then the weight of the rider on the pedals 34 causes a depression of the forward ends of the levers 29 and an elevation of the rear ends thereof and of the seat supporting bars 14. When the seat has been raised to the proper height, the pressure on the resilient member 27 is relieved, whereupon they spring out again and the pins 30 will engage in the perforations 31. The inward pressure on the members 27 is secured by the rider's heels.

While I have illustrated a construction of this character wherein the members 27 are made of resilient material, it is obvious that other latching means might be provided. It will likewise be seen that the members 27 constitute latches operatively engaging with the levers to hold the levers adjusted in any angular relation to the bracket members 24 and 26. By providing levers 29 which support the foot rest it is obvious that the seat may be adjusted so as to increase or decrease the distance between the seat and the foot rests and that this adjustment also adjusts the strength of the springs, thus making the springs adjustable to suit heavier or lighter weights. It will likewise be noted that the foot rests are adjustable into parallel relation to the levers 29 when they are not desired to be used and that this is an advantage over a construction wherein the foot rests turn upward to an inoperative position. The attachment may be readily applied to any ordinary make of motorcycle and may be readily removed therefrom. It has relatively few parts and those of very simple construction. It is obvious also that many minor modifications might be made in the details of construction without departing from the spirit of the invention.

I claim:

1. The combination with a motorcycle, of a seat adjusting lever operatively mounted upon the motorcycle, one end of the lever being vertically movable, a vertically movable seat supporting bar mounted on said vertically movable end of the lever and extending upward therefrom, means being provided for holding the lever in adjusted positions.

2. The combination with a motorcycle, of levers operatively mounted upon the motorcycle and carrying foot rests at their forward ends, the rear ends of the levers being vertically movable, and vertically movable seat supporting bars mounted on said levers and extending upward therefrom, coiled compression springs supported by said levers and supporting said seat supporting bars, means being provided for holding the levers in adjusted positions.

3. The combination with a motorcycle having an upwardly extending saddle post, of a rear seat having arms attached thereto extending forward and pivotally engaged with the saddle post, supporting bars pivotally connected to the arms and extending downward therefrom, levers operatively connected to the frame of the motorcycle and carrying foot rests at their forward ends, said levers at their rear ends being vertically movable operatively engaging the seat supporting bars, and means for holding the levers in adjusted positions.

4. The combination with a motorcycle having an upwardly extending saddle post, of a rear seat having arms attached thereto extending forward and pivotally engaged with the saddle post, supporting bars pivotally connected to the arms and extending downward therefrom, levers operatively connected to the frame of the motorcycle and carrying foot rests at their forward ends, said levers at their rear ends operatively engaging the seat supporting bars, means for holding the levers in adjusted positions, said means including an arcuate member having a series of perforations, and members on the levers detachably engaging in said perforations.

5. The combination with a motorcycle having an upwardly extending saddle post, of a rear seat having arms attached thereto extending forward and pivotally engaged with the saddle post, supporting bars pivotally connected to the arms and extending downward therefrom, levers operatively connected to the frame of the motorcycle and carrying foot rests at their forward ends, said levers at their rear ends operatively engaging the seat supporting bars, means for holding the levers in adjusted positions, said means including an arcuate member having a series of perforations, and members on the levers detachably engaging in said perforations.

6. The combination with a vehicle, of a lever pivotally mounted thereon and having a pedal at one end, said lever being pivoted to the frame of the vehicle intermediate its ends, a vertically movable seat, and an operative connection between the end of the lever opposite the pedal and said seat whereby the seat may be vertically shifted upon an adjustment of the lever, and means for locking the lever and seat in their adjusted positions.

7. A seat supporting attachment for motorcycles comprising a seat having a pair of converging arms adapted at their ends to be pivotally connected to the saddle post of a motorcycle, seat supporting bars pivoted to said arms and depending therefrom, brackets adapted to be detachably connected to the frame of the motorcycle, levers pivoted to said brackets and operatively engaging at their rear ends with the seat supporting bars, said rear ends of the levers being vertically movable, foot rests carried at the forward ends of the levers, and coacting means on the levers and brackets for locking the levers in any angularly adjusted position with relation to the brackets.

8. A seat supporting attachment for motorcycles, comprising a seat having a pair of converging arms adapted at their ends to be pivotally connected to the saddle post of a motorcycle, seat supporting bars pivoted to said arms and depending therefrom, the lower ends of the bars being tubular and longitudinally slotted, coiled compression springs disposed in the lower ends of the bars, brackets adapted to be operatively connected to the frame of the motorcycle, levers pivoted to said brackets and having their rear ends extending through the slots in the bars and engaging beneath the springs therein, an arcuate perforated member carried upon each bracket and against which the corresponding lever operates, and a pin on each lever operatively engaging in said perforations and adapted to be disengaged therefrom to permit the adjustment of the levers.

9. The combination with a motorcycle, of levers operatively mounted upon the motorcycle and carrying foot rests at their forward ends, the rear ends of the levers being vertically movable, vertical seat supporting bars engaging the rear ends of said levers, resilient means disposed between the levers and the seat supporting bars and cushioning the seat supporting bars on the levers, and means for holding the levers in adjusted positions.

10. The combination with a motorcycle, of levers operatively mounted upon the motorcycle and carrying foot rests at their forward ends, vertical seat supporting bars engaged with the rear ends of the levers, seat carrying members pivoted at their forward ends to the frame of the motorcycle and pivoted to the upper ends of the seat supporting bars, resilient means supporting the seat supporting bars on the levers and providing for a yielding engagement between the seat supporting bars and the levers, and means for holding the levers in adjusted positions.

11. In a vehicle, a vertically shiftable seat supporting member, a seat operatively mounted thereon and shiftable therewith, a lever pivoted to the frame of the vehicle and operatively connected to the seat supporting member to raise or lower it as the lever is shifted, and means for locking the lever in its shifted positions.

12. The combination with a vehicle, of a vertically shiftable seat supporting member having a pair of downwardly extending legs, a seat operatively mounted upon the upper end of the seat supporting member, levers pivoted to the frame of the vehicle and each operatively engaged at its rear end with the corresponding leg of the seat supporting member, the levers being pivoted for vertical movement to thereby vertically shift the seat supporting member and seat, and means for locking the levers in their shifted positions.

13. The combination with a vehicle, of a vertically movable spring, a seat mounted upon the vehicle for free vertical movement and supported by said spring, vertically movable, pedally operated means engageable with the lower end of the spring to vertically adjust the spring and the seat together, and means for locking the pedally operated means in its adjusted positions.

In testimony whereof I hereunto affix my signature in the presence of two witnesses.

JOHN P. McENROE.

Witnesses:
 CHRISTOPHER C. FRYE,
 PAUL JUNEAU.

Copies of this patent may be obtained for five cents each, by addressing the "Commissioner of Patents, Washington, D. C."